United States Patent
Yoshikuwa (10) Patent No.: US 7,815,230 B2
(45) Date of Patent: Oct. 19, 2010

(54) ACTUATOR UNIT

(75) Inventor: Masakatsu Yoshikuwa, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 485 days.

(21) Appl. No.: 11/802,490

(22) Filed: May 23, 2007

(65) Prior Publication Data

US 2007/0277632 A1 Dec. 6, 2007

(30) Foreign Application Priority Data

Jun. 1, 2006 (JP) ............... 2006-153783

(51) Int. Cl.
*E05C 3/06* (2006.01)
(52) U.S. Cl. ............... 292/201; 292/216; 292/DIG. 23; 74/425; 74/89.14
(58) Field of Classification Search ............... 292/201, 292/216, DIG. 23; 74/89.14, 425, 625
See application file for complete search history.

(56) References Cited

U.S. PATENT DOCUMENTS

| 4,518,181 | A | 5/1985 | Yamada |
| 4,904,006 | A * | 2/1990 | Hayakawa et al. ....... 292/336.3 |
| 5,649,726 | A | 7/1997 | Rogers, Jr. et al. |
| 6,386,599 | B1 * | 5/2002 | Chevalier .................... 292/201 |
| 6,575,507 | B2 * | 6/2003 | Reddmann .................. 292/216 |
| 7,032,937 | B2 * | 4/2006 | Boecker et al. ............. 292/201 |
| 7,059,640 | B2 * | 6/2006 | Tensing et al. ............. 292/201 |
| 2004/0099077 | A1 | 5/2004 | Weis |

FOREIGN PATENT DOCUMENTS

| DE | 20 2004 020 037 U1 | 4/2006 |
| EP | 1 178 172 A2 | 2/2002 |
| JP | 2546266 B2 | 8/1996 |
| JP | 3310965 B2 | 5/2002 |
| JP | 3671503 B2 | 4/2005 |

* cited by examiner

*Primary Examiner*—Peter M. Cuomo
*Assistant Examiner*—Mark Williams
(74) *Attorney, Agent, or Firm*—Foley & Lardner LLP (57) ABSTRACT

When an output shaft is positioned in a first angular position or a second angular position, the output shaft is allowed to rotate from one angular position to the other angular position without rotating a worm wheel. When the worm wheel is rotated to rotate the output shaft from one angular position to the other angular position, the rotation of the worm wheel is transmitted to the output shaft. When the output shaft is placed in the other angular position, driving-force transmission to the output shaft is released, and at the same time, rotation of the worm wheel is stopped.

8 Claims, 6 Drawing Sheets

ACTUATOR UNIT

BACKGROUND OF THE INVENTION

1. Field of the Invention

The present invention relates to an actuator unit that shifts a door lock device of a vehicle between a locked position and an unlocked position.

This application claims priority from Japanese Patent Application No. 2006-153783, filed Jun. 1, 2006, which is incorporated herein by reference in its entirety.

2. Description of the Related Art

An actuator unit for shifting a door lock device of a vehicle between a locked position and an unlocked position is described, for example, in Japanese Patent No. 3310965. The actuator unit includes an electric motor that includes a worm gear fixed to its drive shaft, a worm wheel that engages with the worm gear, an output shaft that is parallel to an axis of the worm wheel, and a transmission mechanism that transmits rotation of the worm wheel to the output shaft. A driving force of the electric motor counter-turns the output shaft between a first angular position and a second angular position to shift the door lock device between the locked position and the unlocked position. The actuator unit includes as the transmission mechanism a drive gear mounted on the worm wheel, and a rotating lever mounted on the output shaft. Drive gear teeth mesh with rotating lever teeth, as required, to transmit rotation of the worm wheel to the output shaft.

In the actuator unit, the transmission mechanism is configured such that when the drive gear is placed in a predetermined neutral angular position, the drive gear does not rotate even when the rotating lever is oscillated. Specifically, the actuator unit is configured in such a manner that when the drive gear is in the neutral angular position due to shifting of the drive gear teeth in the axial direction of the worm wheel, the rotating lever teeth do not engage with the drive gear teeth by the oscillation of the rotating lever. On the other hand, when the drive gear rotates, the drive gear teeth engage with the rotating lever teeth. Thus, the conventional actuator unit does not cause any extra burden of operation when the door lock device is shifted between the locked and unlocked positions manually, and operability of the actuator unit is not compromised.

In the conventional actuator unit, after the output shaft is rotated due to the rotation of the worm wheel either in the first position or in the second position, position of the worm wheel needs to be specified so that the drive gear is always in the neutral angular position. Therefore, in the conventional actuator unit, a return spring is arranged within a case that houses the worm wheel for restoring the worm wheel in the neutral angular position by the resilience of the return spring after the electric motor is stopped.

However, in the conventional actuator unit with such configuration, the return spring is always elastically deformed when the output shaft is rotated. Thus, a larger electric motor is needed to resist the elasticity of the return spring, which is not desirable when downsizing of the actuator unit is required.

SUMMARY OF THE INVENTION

It is an object of the present invention to at least partially solve the problems in the conventional technology.

According to an aspect of the present invention, an actuator unit that shifts a door lock device between a locked position and an unlocked position, includes an output shaft that rotates around an axis, an actuator that rotates the output shaft between a first angular position and a second angular position with driving force, and a drive gear that rotates due to the driving force of the actuator, a transmission mechanism that transmits rotation of the drive gear to the output shaft. The transmission mechanism allows, when the output shaft is placed in any one of the first angular position and the second angular position, rotation of the output shaft from the angular position to the other angular position without causing rotation of the drive gear. When the drive gear is rotated to rotate the output shaft from any one of the first angular position and the second angular position to the other angular position, rotation of the drive gear is transmitted to the output shaft, and, upon the output shaft being placed in the other angular position, the driving force on the output shaft is released, and rotation of the drive gear is stopped.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
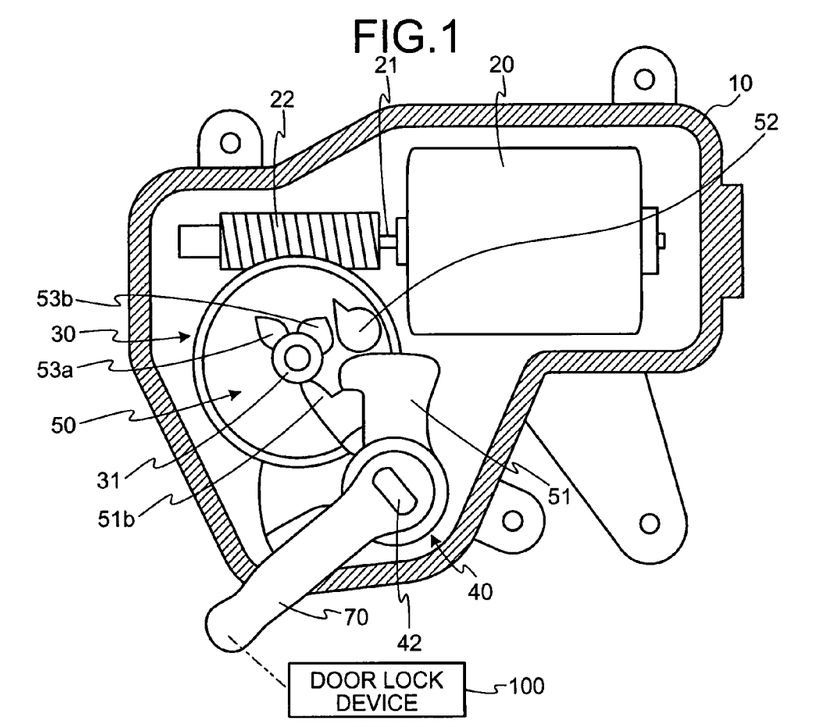
FIG. 1 is an inside view of an actuator unit according to an embodiment of the present invention.
Figure 2:
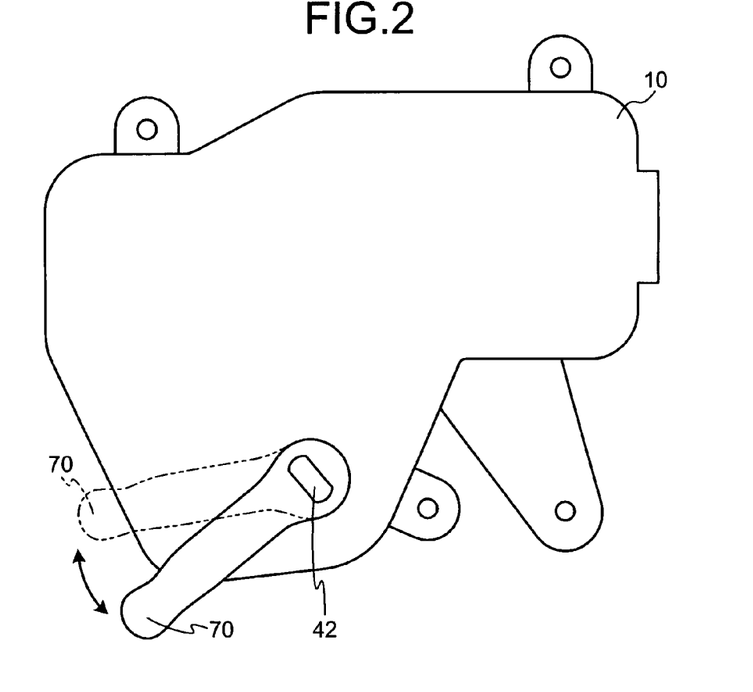
FIG. 2 is a schematic exterior view of the actuator unit.

FIGS. 1 and 2 are schematics of an actuator unit according to an embodiment of the present invention. The actuator unit is connected to a door lock device 100 used in vehicles such as a four-wheel drive car to shift the door lock device 100 between a locked position and an unlocked position. The actuator unit includes a case 10 that houses an electric motor 20, a worm wheel 30, and an output shaft 40.

Figure 3:
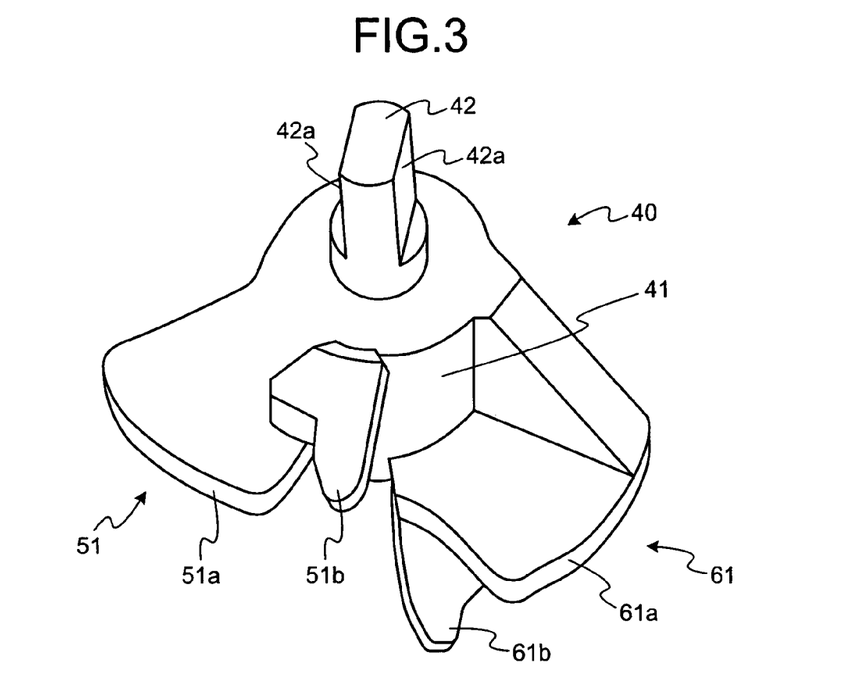
FIG. 3 is a schematic of an output shaft used in the actuator unit as viewed from one side.
Figure 4:
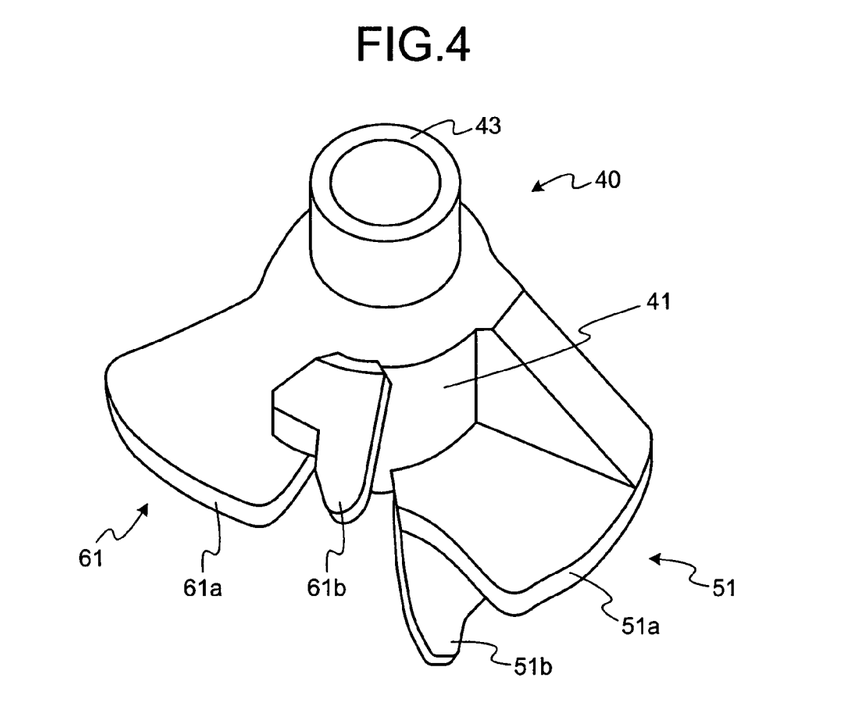
FIG. 4 is a schematic of the output shaft as viewed from another side.

The electric motor 20 includes a drive shaft 21 and a worm gear 22, and rotates according to a direction of power supply. The worm gear 22 is a multi-threaded cylindrical screw, and is fixed to the drive shaft 21 of the electric motor 20. The worm gear 22, used in the embodiment, is a double-threaded screw. The worm wheel 30 is a discoid with angular teeth on its circumferential surface. The worm wheel 30 includes a supporting shaft 31 whose axis is perpendicular to the drive shaft 21. The worm wheel 30 is rotatably arranged in the case 10 such that the angular teeth mesh with the teeth of the worm gear 22. The output shaft 40, as shown in FIGS. 3 and 4, is a column-shaped member that includes a base 41, an output member 42, and a cylindrical bearing 43. The base 41 has a relatively large diameter. The output member 42 has a smaller diameter, and extends coaxially with the base 41 from one end of the base 41. The bearing 43 has a relatively small diameter, and extends coaxially with the base 41 from the other end of the base 41. The axis of the output shaft 40 is parallel to that of the worm wheel 30. The output shaft 40 is rotatably arranged in the case 10 such that the output member 42 is exposed outside. The output member 42 protruding from the case 10 has engaging surfaces 42a positioned parallel to each other.

The actuator unit further includes a first transmission mechanism 50 that is placed in between the output shaft 40 and a first surface of the worm wheel 30, and a second transmission mechanism 60 that is placed in between the output shaft 40 and a second surface of the worm wheel 30. The first transmission mechanism 50 rotates the output shaft 40 in one rotational direction of the worm wheel 30, and the second transmission mechanism 60 rotates the output shaft 40 in another rotational direction of the worm wheel 30. The first transmission mechanism 50 includes a first lever 51, a first stopper 52, and a first engaging member 53. The second transmission mechanism 60 includes a second lever 61, a second stopper 62, and a second engaging member 63.

Figure 5A:
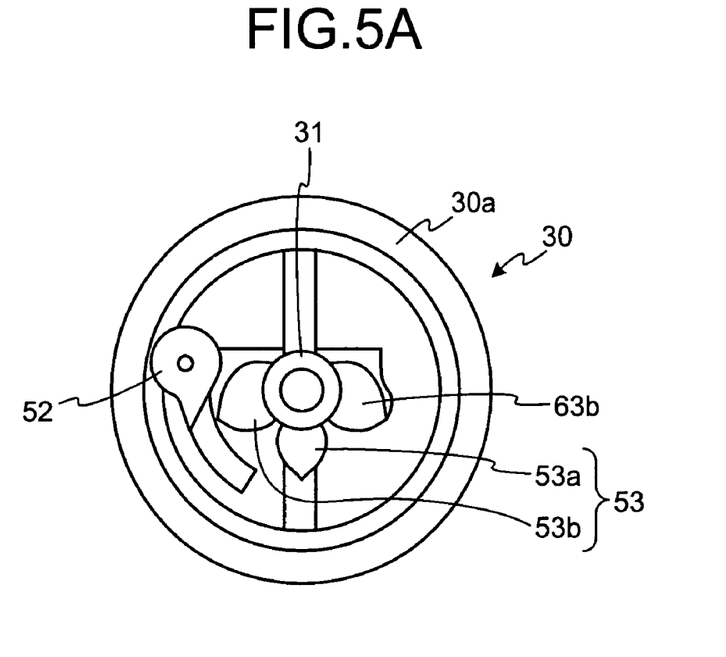
FIGS. 5A and 5B are overhead views of a drive gear used in the actuator unit.
Figure 6:
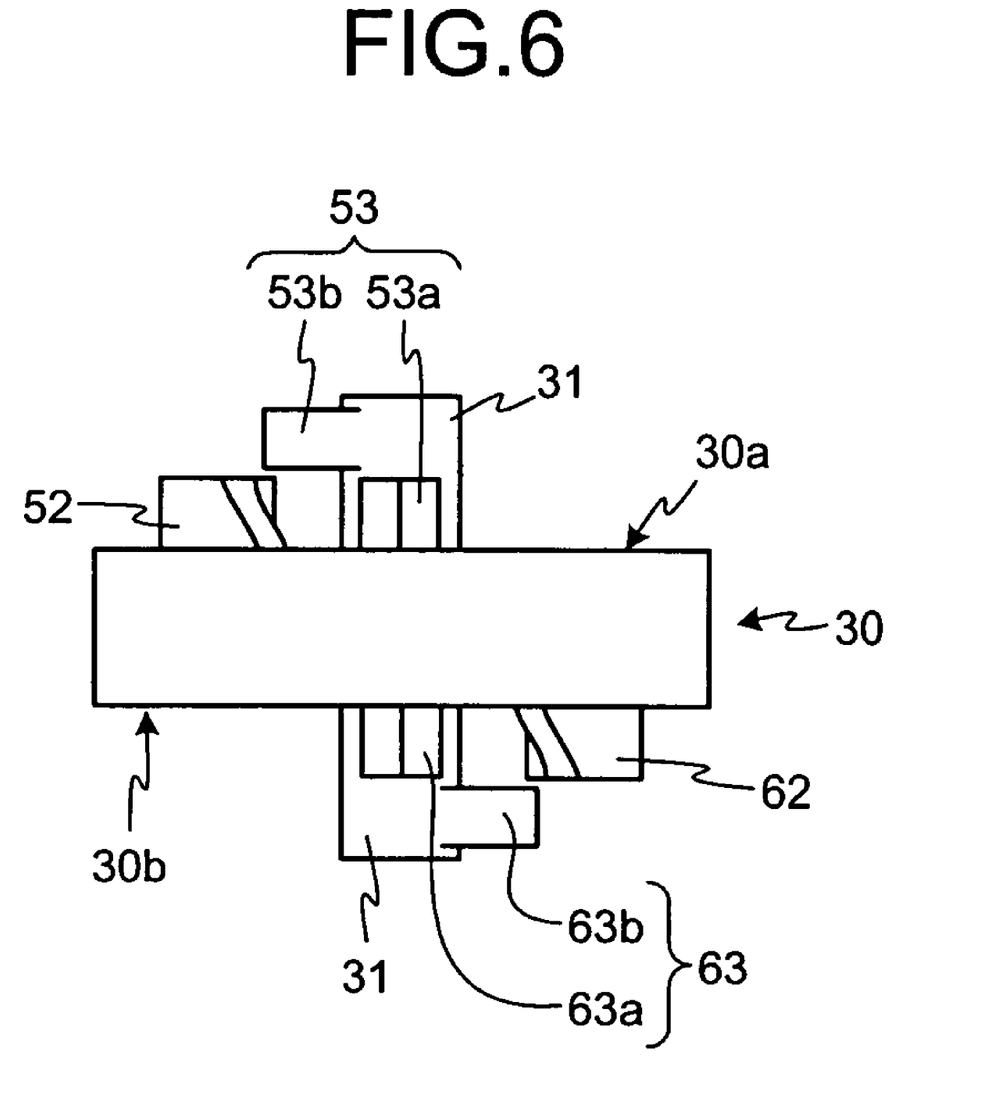
FIG. 6 is a side view of the drive gear.

The first stopper 52, as shown in FIGS. 5A and 6, is a column shaped part that is placed on a periphery of the first surface of the worm wheel 30 with a predetermined distance from the axis of the supporting shaft 31. The first stopper 52 extends from a first edge portion 30a of the worm wheel 30 along the same direction as the supporting shaft 31. The first stopper 52 is sufficiently lower in height than the supporting shaft 31, and in the embodiment, the height of the first stopper 52 is almost half of that of the supporting shaft 31.

The first engaging member 53 is a tooth-shaped part on the first surface of the worm wheel 30. The first engaging member 53 extends from the circumferential surface of the supporting shaft 31 towards the outer diametrical periphery of the worm wheel 30. In the embodiment, the first engaging member 53 includes, on the supporting shaft 31, a first inside tooth 53a that faces the first stopper 52, and a first outside tooth 53b on outer side of an outer edge of the first stopper 52.

Figure 7:
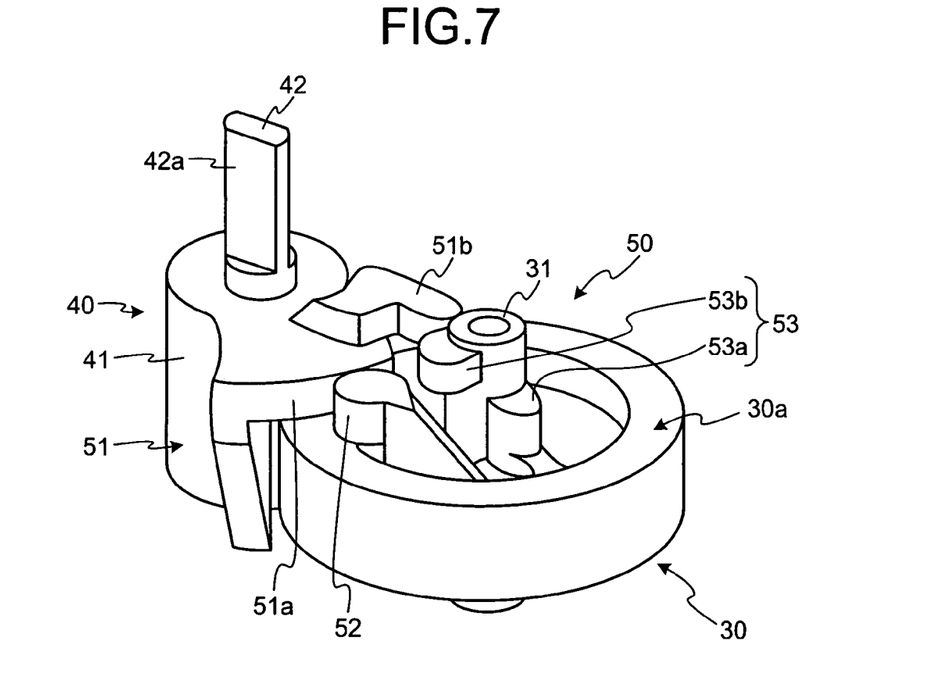
FIG. 7 is a perspective view of a first transmission mechanism used in the actuator unit.

The first lever 51, as shown in FIGS. 3 and 7, extends in a fan shape from one part of the circumferential surface of the base 41 of the output shaft 40 to face the first edge portion 30a of the worm wheel 30. The first lever 51 includes a first stopper face 51a and a first lever tooth 51b.

The first stopper face 51a extends along an arc with the output shaft 40 as its center. Measurement of the first stopper face 51a extending along the output shaft 40 is substantially the same as that of the first stopper 52 of the worm wheel 30. If rotated around the axis of the output shaft 40, the first stopper face 51a touches the first stopper 52 and the first inside tooth 53a, and does not touch the first outside tooth 53b. The first stopper face 51a is arranged in such a manner that a distance from the axis of the output shaft 40 to the edge of the first stopper face 51a is shorter than a distance between the center of the output shaft 40 and the worm wheel 30. Thus, the first stopper face 51a does not touch the supporting shaft 31 of the worm wheel 30 when the output shaft 40 is rotated around the axis.

The first lever tooth 51b is arranged at a predetermined angle with respect to the first lever 51, and extends outwardly in the diametrical direction of the output shaft 40. The first lever tooth 51b is arranged on an external surface of the first lever 51, and faces the first outside tooth 53b of the first engaging member 53. When the output shaft 40 is rotated around the axis, the first lever-tooth 51b touches the first outside tooth 53b, and does not touch any one of the first stopper 52 and the first inside tooth 53a. The first lever tooth 51b, as with the first stopper face 51a, is arranged in such a manner that a distance from the axis of the output shaft 40 to the end of the first lever tooth 51b is shorter than a distance between the center of the output shaft 40 and the worm wheel 30. Thus, the first lever tooth 51b does not interfere with the supporting shaft 31 of the worm wheel 30 when the output shaft 40 is rotated around the axis.

Figure 9:
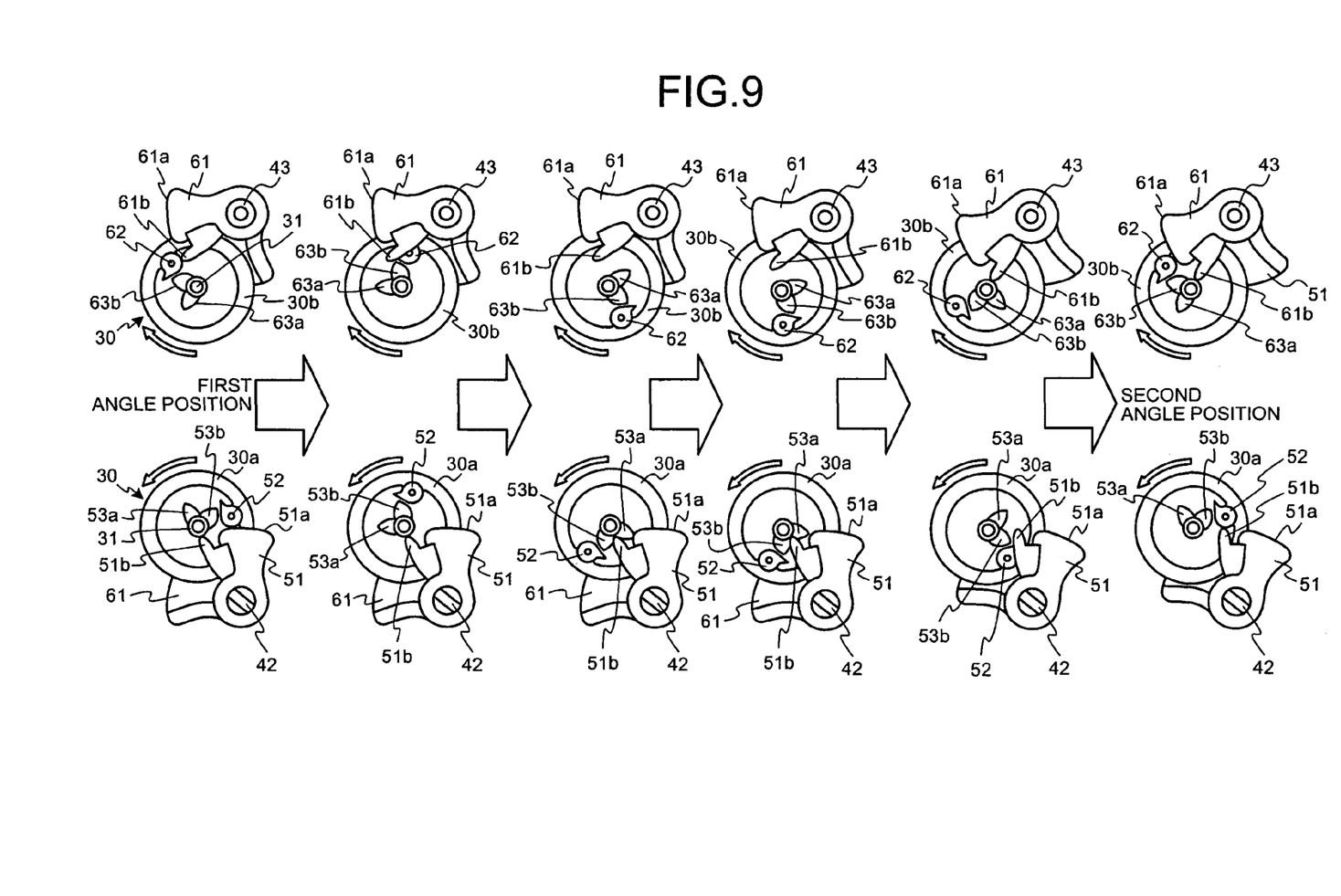
FIG. 9 is a schematic for explaining operation of the actuator unit.

Interrelation of respective components of the first transmission mechanism 50 is explained with reference to FIG. 5A and a lower part of FIG. 9. Viewing from the first edge portion 30a of the worm wheel 30, when the first inside tooth 53a is placed in the six o'clock position, the first outside tooth 53b and the first stopper 52 are placed substantially in the nine o'clock position. Viewing from the first edge portion 30a of the worm wheel 30, when the first lever tooth 51b is in the six o'clock position, the first lever 51 is placed substantially in between the half past six and eight o'clock positions. FIG. 9 is a schematic for explaining operation of the actuator unit. The upper part of FIG. 9 depicts the second transmission mechanism 60, and the lower part depicts the first transmission mechanism 50. The worm wheel 30 is in the same rotating position with respect to each pair of the first transmission mechanism 50 and the second transmission mechanism 60 in the upper and lower parts of FIG. 9.

When the first lever 51 is appropriately rotated around the axis of the output shaft 40, and a tip of the first lever tooth 51b faces the axis of the supporting shaft 31 in the worm wheel 30 (hereinafter, this angular position with respect to the output shaft 40 is referred to as a first-angular position), the first stopper face 51a of the first lever 51 is positioned in a movement range in which the first stopper 52 moves due to the rotation of the worm wheel 30. Thus, the first stopper 52 and the first stopper face 51a come in contact with each other. When the output shaft 40 is in the first angular position, and the first stopper 52 is brought in contact with the first stopper face 51a, both the first stopper 52 and the first engaging member 53 are positioned outside an oscillating range in which the first lever 51 and the first lever tooth 51b swing due to the rotation of the output shaft 40. Thus, the output shaft 40 can be rotated in an arbitrary direction without rotating the worm wheel 30.

In such a case, if the worm wheel 30 is rotated in such a manner that the first stopper 52 is distanced from the first stopper face 51a, the first inside tooth 53a of the first engaging member 53 engages with the first lever 51, and the first outside tooth 53b engages with the first lever tooth 51b, which enables rotation of the output shaft 40. While the output shaft 40 is rotating, if the tip of the first lever tooth 51b is positioned outside the rotation range of the first outside tooth 53b (hereinafter, this angular position with respect to the output shaft 40 is referred to as a second angular position), the output shaft 40 does not rotate even when the worm wheel 30 is rotated in the same direction. In the second angular position, both the first stopper 52 and the first engaging member 53 are positioned outside the oscillating range of the first lever 51 and the first lever tooth 51b. Thus, the output shaft 40 can be rotated in an arbitrary direction without rotating the worm wheel 30.

Figure 5B:
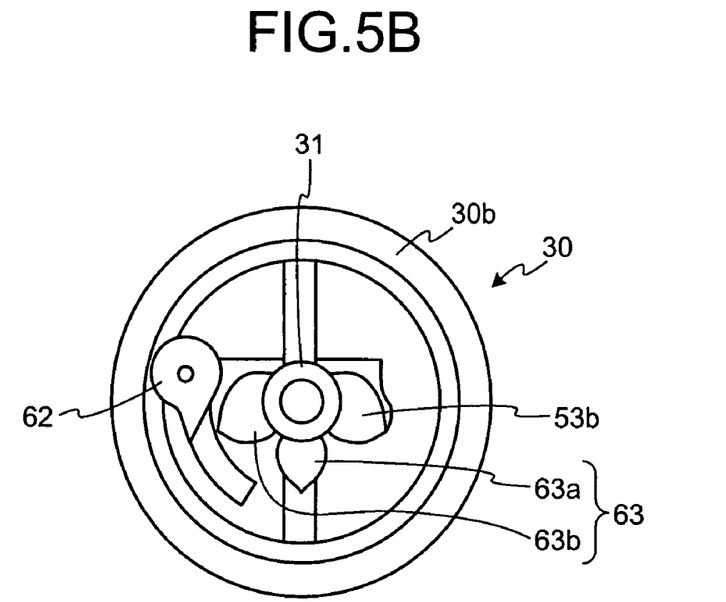

The second stopper 62, as shown in FIGS. 5B and 6, is a column shaped part that extends along the direction of the supporting shaft 31 from a second edge portion 30b of the worm wheel 30. The second stopper 62 is placed on a periphery the second surface of the worm wheel 30 with a predetermined distance from the axis of the supporting shaft 31. The second stopper 62 is sufficiently lower in height than the supporting shaft 31, and in the embodiment, the height of the second stopper 62 is almost half of that of the supporting shaft 31.

The second engaging member 63 is a tooth shaped part on the second surface of the worm wheel 30. The first engaging member 53 extends from the circumferential surface of the supporting shaft 31 towards the outer diametrical periphery of the worm wheel 30. In the embodiment, the second engaging member 63 includes, on the supporting shaft 31, a second inside tooth 63a that faces the second stopper 62, and a second outside tooth 63b on the outer side of an outer edge of the second stopper 62.

Figure 8:
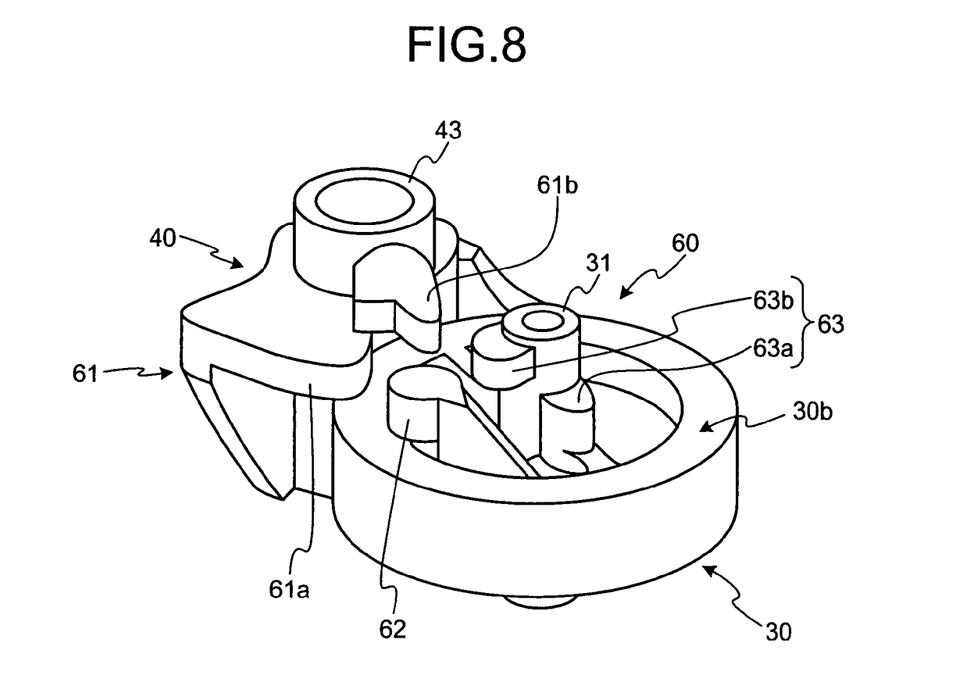
FIG. 8 is a perspective view of a second transmission mechanism used in the actuator unit.

The second lever 61, as shown in FIGS. 4 and 8, extends in a fan shape from the base 41 of the output shaft 40 to face the second edge portion 30b of the worm wheel 30. The second lever 61 includes a second stopper face 61a and a second lever tooth 61b.

The second stopper face 61a extends along an arc with the output shaft 40 as its center. Measurement of the second stopper face 61a extending along the output shaft 40 is substantially the same as that of the second stopper 62 of the worm wheel 30. If rotated around the axis of the output shaft 40, the second stopper face 61a touches the second stopper 62 and the second inside tooth 63a, and does not touch the second outside tooth 63b. The second stopper face 61a is arranged in such a manner that a distance from the axis of the output shaft 40 to the edge of the second stopper face 61a is shorter than a distance between the center of the output shaft 40 and the worm wheel 30. Thus, the second stopper face 61a does not touch the supporting shaft 31 of the worm wheel 30 when the output shaft 40 is rotated around the axis.

The second lever tooth 61b is arranged at a predetermined angle with respect to the second lever 61, and extends outwardly in the diametrical direction of the output shaft 40. The second lever tooth 61b is arranged on an external surface of the second lever 61, and faces the second outside tooth 63b of the second engaging member 63. When the output shaft 40 is rotated around the axis, the second lever tooth 61b touches the second outside tooth 63b, and does not touch any one of the second stopper 62 and the second inside tooth 63a. The second lever tooth 61b, as with the second stopper face 61a, is arranged in such a manner that a distance from the axis of the output shaft 40 to the end of the second lever tooth 61b is shorter than a distance between the center of the output shaft 40 and the worm wheel 30. Thus, the second lever tooth 61b does not interfere with the supporting shaft 31 of the worm wheel 30 when the output shaft 40 is rotated around the axis.

Interrelation of respective components of the second transmission mechanism 60 is explained with reference to FIG. 5B and an upper part of FIG. 9. Viewing from the second edge portion 30b of the worm wheel 30, when the second inside tooth 63a is placed in the six o'clock position, the second outside tooth 63b and the second stopper 62 are placed substantially in the nine o'clock position. Viewing from the second edge portion 30b of the worm wheel 30, when the second lever tooth 61b is in the six o'clock position, the second lever 61 is placed substantially in between the half past six and eight o'clock positions.

When the second lever 61 is appropriately rotated around the axis of the output shaft 40 to the second angular position, and a tip of the second lever tooth 61b faces the axis of the supporting shaft 31 in the worm wheel 30, the second stopper face 61a of the second lever 61 is positioned in a movement range in which the second stopper 62 moves due to the rotation of the worm wheel 30. Thus, the second stopper 62 and the second stopper face 61a come in contact with each other. When the output shaft 40 is in the second angular position, and the second stopper 62 is brought in contact with the second stopper face 61a, both the second stopper 62 and the second engaging member 63 are positioned outside an oscillating range in which the second lever 61 and the second lever tooth 61b swing due to the rotation of the output shaft 40. Thus, the output shaft 40 can be rotated in an arbitrary direction without rotating the worm wheel 30.

In such a case, if the worm wheel 30 is rotated in such a manner that the second stopper 62 is distanced from the second stopper face 61a, the second inside tooth 63a of the second engaging member 63 engages with the second lever 61, and the second outside tooth 63b engages with the second lever tooth 61b, which enables rotation of the output shaft 40. While the output shaft 40 is rotating, if the tip of the second lever tooth 61b is positioned outside the rotation range of the second outside tooth 63b, the output shaft 40 is placed in the first angular position, and does not rotate even when the worm wheel 30 is rotated in the same direction. In the first angular position, also, both the second stopper 62 and the second engaging member 63 are positioned outside the oscillating range of the second lever 61 and the second lever tooth 61b. Thus, the output shaft 40 can be rotated in an arbitrary direction without rotating the worm wheel 30.

As shown in FIGS. 1 and 2, the actuator unit includes an output lever 70 that is fitted to the output member 42 of the output shaft 40, which is exposed outside the case 10. The actuator unit is mounted on the vehicle while the output lever 70 appropriately engages with the door lock device 100.

It is assume that the door lock device 100 is in the locked position when the output shaft 40 is brought to the first angular position. When the output shaft 40 is placed in the first angular position, the output shaft 40 can be rotated without rotating the worm wheel 30. Accordingly, if the door lock device 100 is shifted from the locked position to the unlocked position by, for example, manually operating a sill knob (not shown) from inside the vehicle or a key from outside the vehicle, the output shaft 40 rotates to the second angular position. Thus, the door lock device 100 can be unlocked without any extra operation.

If the electric motor 20 is driven when the door lock device 100 is in the locked position to rotate the worm wheel 30 in a direction that the first stopper 52 is distanced from the first stopper face 51a, as shown in the lower part of FIG. 9, the first inside tooth 53a and the first outside tooth 53b of the first engaging member 53 sequentially engage with the first lever 51 and the first lever tooth 51b due to the driving force of the first transmission mechanism 50. This enables rotation of the output shaft 40 to the second angular position. As a result, the door lock device 100 shifts from the locked position to the unlocked position through the output lever 70 attached to the output member 42 of the output shaft 40. During this period, in the second transmission mechanism 60, the second engaging member 63 does not engage with the second lever 61 and the second lever tooth 61b. The second stopper 62 touches the second stopper face 61a when the output shaft 40 reaches the second angular position, and the output shaft 40 is set in the second angular position accurately.

On the other hand, if the electric motor 20 is driven when the output shaft 40 is in the second angular position to rotate the worm wheel 30 in a direction that the second stopper 62 is distanced from the second stopper face 61a, the second inside tooth 63a and the second outside tooth 63b of the second engaging member 63 sequentially engage with the second lever 61 and the second lever tooth 61b due to the driving force of the second transmission mechanism 60. This enables rotation of the output shaft 40 to the first angular position. As a result, the door lock device 100 shifts from the unlocked position to the locked position through the output lever 70 attached to the output member 42 of the output shaft 40. During this period, in the first transmission mechanism 50, the first engaging member 53 does not engage with the first lever 51 and the first lever tooth 51*b*. The first stopper 52 touches the first stopper face 51*a* when the output shaft 40 reaches the first angular position, and the output shaft 40 is set in the first angular position accurately.

Obviously, when the output shaft 40 is placed in the second angular position, the output shaft 40 can be rotated without rotating the worm wheel 30. Accordingly, if the door lock device 100 is shifted from the unlocked position to the locked position by, for example, manually operating a sill knob (not shown) from inside the vehicle or a key from outside the vehicle, the output shaft 40 rotates to the second angular position. Thus, the door lock device 100 can be locked without any extra operation.

Repetition of the above-mentioned operations enables the door lock device 100 to be shifted between the locked position and the unlocked position by driving the actuator unit. The actuator unit is not required to bring the worm wheel 30 or the output shaft 40 to the neutral position, which eliminates the need for a return spring. The electric motor 20 also is not required for output to resist the elasticity of the return spring, which allows the use of a smaller motor. Thus, it is possible to reduce the size of the actuator unit.

As set forth hereinabove, according to the embodiment of the present invention, when the output shaft is placed in either the first angular position or the second angular position, the output shaft can rotate to the other angular position without causing the rotation of the drive gear. If the drive gear is rotated to rotate the output shaft from one angular position to the other, the rotation of the drive gear is transmitted to the output shaft. When the output shaft reaches the other angular position, driving-force transmission to the output shaft is canceled, and rotation of the drive gear is stopped. Thus, manual operability of the door lock device can be ensured without bringing the drive gear to the neutral angular position. This eliminates the need for a return spring attached to the drive gear, resulting in miniaturization of the actuator unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An actuator unit that shifts a door lock device between a locked position and an unlocked position, the actuator unit comprising:
    an output shaft that rotates around an axis;
    an actuator that rotates the output shaft between a first angular position and a second angular position with driving force;
    a drive gear that rotates due to the driving force of the actuator; and
    a transmission mechanism that transmits rotation of the drive gear to the output shaft;
    wherein the transmission mechanism allows, when the output shaft is placed in any one of the first angular position and the second angular position, rotation of the output shaft from the one of the first and second angular positions to the other of the first and second angular positions without causing rotation of the drive gear,
    wherein the transmission mechanism allows, when the drive gear is rotated to rotate the output shaft from any one of the first angular position and the second angular position to the other of the first and second angular positions, rotation of the drive gear to be transmitted to the output shaft, and, upon the output shaft being placed in the other of the first and second angular positions, the driving force on the output shaft to be released, and rotation of the drive gear to be stopped,
    wherein the transmission mechanism includes a first transmission mechanism and a second transmission mechanism,
    wherein the first transmission mechanism includes:
        a first stopper member that protrudes from a first side of the drive gear;
        a first lever that extends from the output shaft to face a first side of the drive gear, includes an arc-shaped first stopper face centering around the axis of the output shaft, places the first stopper face in a first movement range in which the first stopper member moves due to rotation of the drive gear when the output shaft is placed in the first angular position, and places the first stopper face outside the first movement range when the output shaft is placed in the second angular position; and
        a first engaging member that is arranged on the first side of the drive gear, and engages with the first lever to rotate the output shaft to the second angular position when the output shaft is placed in the first angular position and the drive gear rotates in a direction to distance the first stopper member from the first stopper face, and
    wherein the second transmission mechanism includes:
        a second stopper member that protrudes from a second side of the drive gear;
        a second lever that extends from the output shaft to face the second side of the drive gear, includes an arc-shaped second stopper face centering around the axis of the output shaft, places the second stopper face in a second movement range in which the second stopper member moves due to rotation of the drive gear when the output shaft is placed in the second angular position, and places the second stopper face outside the second movement range when the output shaft is placed in the first angular position; and
        a second engaging member that is arranged on the second side of the drive gear, and engages with the second lever to rotate the output shaft to the first angular position when the output shaft is placed in the second angular position and the drive gear rotates in a direction to distance the second stopper member from the second stopper face.

2. An actuator unit for shifting a door lock device between a locked position and an unlocked position, comprising:
    an output shaft rotatable around an axis;
    an actuator for rotating the output shaft between a first angular position and a second angular position with driving force;
    a drive gear rotatable due to the driving force of the actuator; and
    a transmission mechanism for transmitting rotation of the drive gear to the output shaft;
    wherein the transmission mechanism is configured to allow, when the output shaft is placed in any one of the first angular position and the second angular position, rotation of the output shaft from the one of the first and second angular positions to the other of the first and second angular positions without causing rotation of the drive gear, wherein the transmission mechanism is configured to allow, when the drive gear is rotated to rotate the output shaft from any one of the first angular position and the second angular position to the other of the first and second angular positions, rotation of the drive gear to be transmitted to the output shaft, and, upon the output shaft being placed in the other of the first and second angular positions, the driving force on the output shaft to be released, and rotation of the drive gear to be stopped, wherein the transmission mechanism includes a first transmission mechanism located between the output shaft and a first side of the drive gear, and is configured to rotate the output shaft from the first angular position to the second angular position when the drive gear rotates, and wherein the first transmission mechanism includes:
  a first stopper member that protrudes from the first side of the drive gear;
  a first lever that extends from the output shaft to face the first side of the drive gear, is configured to place a first stopper face in a first movement range in which the first stopper member moves due to rotation of the drive gear when the output shaft is placed in the first angular position, and is configured to place the first stopper face outside the first movement range when the output shaft is placed in the second angular position; and
  a first engaging member that is arranged on the first side of the drive gear, and that is configured to engage with the first lever to rotate the output shaft to the second angular position when the output shaft is placed in the first angular angle position and the drive gear rotates in a direction to distance the first stopper member from the first stopper face.

3. The actuator unit according to claim 2, wherein the transmission mechanism further includes a second transmission mechanism located between the output shaft and a second side of the drive gear, and is configured to rotate the output shaft from the second angular position to the first angular position when the drive gear rotates.

4. The actuator unit according to claim 3, wherein the second transmission mechanism includes:
  a second stopper member that protrudes from the second side of the drive gear;
  a second lever that extends from the output shaft to face the second side of the drive gear, is configured to place a second stopper face in a second movement range in which the second stopper member moves due to rotation of the drive gear when the output shaft is placed in the second angular position, and is configured to place the second stopper face outside the second movement range when the output shaft is placed in the first angular position; and
  a second engaging member that is arranged on the second side of the drive gear, and that is configured to engage with the second lever to rotate the output shaft to the first angular position when the output shaft is placed in the second angular position and the drive gear rotates in a direction to distance the second stopper member from the second stopper face.

5. The actuator unit according to claim 2, wherein the actuator is an electric motor fixed with a worm gear on a drive shaft, and
  wherein the drive gear is a worm wheel that engages with the worm gear.

6. An actuator unit for shifting a door lock device between a locked position and an unlocked position, comprising:
  an output shaft rotatable around an axis;
  an actuator for rotating the output shaft between a first angular position and a second angular position with driving force;
  a drive gear rotatable due to the driving force of the actuator; and
  a transmission mechanism for transmitting rotation of the drive gear to the output shaft;
  wherein the transmission mechanism is configured to allow, when the output shaft is placed in any one of the first angular position and the second angular position, rotation of the output shaft from the one of the first and second angular positions to the other of the first and second angular positions without causing rotation of the drive gear,
  wherein the transmission mechanism is configured to allow, when the drive gear is rotated to rotate the output shaft from any one of the first angular position and the second angular position to the other of the first and second angular positions, rotation of the drive gear to be transmitted to the output shaft, and, upon the output shaft being placed in the other of the first and second angular positions, the driving force on the output shaft to be released, and rotation of the drive gear to be stopped,
  wherein the transmission mechanism includes a second transmission mechanism located between the output shaft and a second side of the drive gear, and is configured to rotate the output shaft from the second angular position to the first angular position when the drive gear rotates, and
  wherein the second transmission mechanism includes:
    a second stopper member that protrudes from the second side of the drive gear;
    a second lever that extends from the output shaft to face the second side of the drive gear, is configured to place a second stopper face in a second movement range in which the second stopper member moves due to rotation of the drive gear when the output shaft is placed in the second angular position, and is configured to place the second stopper face outside the second movement range when the output shaft is placed in the first angular position; and
    a second engaging member that is arranged on the second side of the drive gear, and that is configured to engage with the second lever to rotate the output shaft to the first angular position when the output shaft is placed in the second angular position and the drive gear rotates in a direction to distance the second stopper member from the second stopper face.

7. The actuator unit according to claim 6, wherein the transmission mechanism further includes a first transmission mechanism located between the output shaft and a first side of the drive gear, and is configured to rotate the output shaft from the first angular position to the second angular position when the drive gear rotates.

8. The actuator unit according to claim 6, wherein the actuator is an electric motor fixed with a worm gear on a drive shaft, and
  wherein the drive gear is a worm wheel that engages with the worm gear.

* * * * *